US008285739B2

(12) United States Patent
Dettinger et al.

(10) Patent No.: US 8,285,739 B2
(45) Date of Patent: Oct. 9, 2012

(54) SYSTEM AND METHOD FOR IDENTIFYING QUALIFYING DATA RECORDS FROM UNDERLYING DATABASES

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1278 days.

(21) Appl. No.: 11/191,469

(22) Filed: Jul. 28, 2005

(65) Prior Publication Data

US 2007/0027845 A1    Feb. 1, 2007

(51) Int. Cl.
*G06F 17/30* (2006.01)
(52) U.S. Cl. ...................................................... 707/769
(58) Field of Classification Search .................. None
See application file for complete search history.

(56) References Cited

U.S. PATENT DOCUMENTS

| | | | |
|---|---|---|---|
| 5,263,159 A * | 11/1993 | Mitsui ................................. | 707/5 |
| 5,630,121 A | 5/1997 | Braden-Harder et al. | |
| 5,671,404 A * | 9/1997 | Lizee et al. ............ | 707/999.003 |
| 5,734,887 A | 3/1998 | Kingberg et al. | |
| 5,761,149 A | 6/1998 | Suzuki et al. | |
| 6,009,422 A | 12/1999 | Ciccarelli | |
| 6,233,586 B1 | 5/2001 | Chang et al. | |
| 6,457,009 B1 | 9/2002 | Bollay | |
| 6,460,043 B1 | 10/2002 | Tabbara et al. | |
| 6,553,368 B2 | 4/2003 | Martin et al. | |
| 6,601,065 B1 | 7/2003 | Nelson et al. | |
| 6,725,227 B1 | 4/2004 | Li | |
| 6,820,076 B2 | 11/2004 | Bailey et al. | |
| 6,928,431 B2 | 8/2005 | Dettinger et al. | |
| 6,954,748 B2 | 10/2005 | Dettinger et al. | |
| 6,996,558 B2 | 2/2006 | Dettinger et al. | |

(Continued)

FOREIGN PATENT DOCUMENTS

JP    2004/029969 A    1/2004

(Continued)

OTHER PUBLICATIONS

U.S. Appl. No. 10/083,075, "Application Portability and Extensibility Through Database Schema and Query Abstraction", filed Feb. 26, 2002.

(Continued)

*Primary Examiner* — Yuk Ting Choi
(74) *Attorney, Agent, or Firm* — Patterson & Sheridan LLP

(57) ABSTRACT

A method, system and article of manufacture for creating queries against databases and, more particularly, for creating queries that are suitable to identify relevant information from one or more underlying databases. One embodiment provides a method of composing a query against data in a database. The method comprises receiving a query having one or more result fields and a plurality of query conditions. Each query condition defines selection criteria for selection of data records from the database. Each selected data record has data that satisfies at least one of the plurality of query conditions. Each of the plurality of query conditions has an associated weight. The method further comprises receiving an accuracy threshold for qualifying data records. The accuracy threshold defines a requested minimum accuracy of each selected data record defining a qualifying data record forming part of a valid result set returned for the query. For each selected data record, it is determined whether the accuracy threshold is satisfied with respect to a cumulative weight of those weighted query conditions that are satisfied.

17 Claims, 12 Drawing Sheets

U.S. PATENT DOCUMENTS

| | | | |
|---|---|---|---|
| 7,096,229 B2 | 8/2006 | Dettinger et al. | |
| 2002/0078068 A1 | 6/2002 | Krishnaprasad et al. | |
| 2003/0014398 A1* | 1/2003 | Ohta et al. | 707/3 |
| 2003/0163455 A1* | 8/2003 | Dettinger et al. | 707/3 |
| 2003/0169284 A1* | 9/2003 | Dettinger et al. | 345/708 |
| 2004/0088292 A1* | 5/2004 | Dettinger et al. | 707/4 |
| 2005/0234904 A1* | 10/2005 | Brill et al. | 707/5 |
| 2006/0010127 A1 | 1/2006 | Dettinger et al. | |

FOREIGN PATENT DOCUMENTS

| | | |
|---|---|---|
| WO | WO-03/012685 A2 | 2/2003 |

OTHER PUBLICATIONS dtSearch Corp, "The Art of the Text Query", pp. 1-5, Jan. 2000.

Jacques Calmet, et al. "A Generic Query-Translation Framework for a Mediator Architecture" 1997, University of Karlsruhe, pp. 434-443.

Llama, "Search Code: Search Your Database," <http://www.codewalkers.com/c/a/Search-Code/Search-Your-Database/>, Jan. 18, 2002, pp. 1-4.

Meng et al., "A Theory of Translation From Relational Queries to Hierarchical Queries," IEEE Transactions on Knowledge and Data Engineering, Apr. 1995, vol. 7(2): pp. 228-245.

* cited by examiner

SYSTEM AND METHOD FOR IDENTIFYING QUALIFYING DATA RECORDS FROM UNDERLYING DATABASES

CROSS-RELATED APPLICATION

This application is related to the following commonly owned application: U.S. patent application Ser. No. 10/083,075, filed Feb. 26, 2002, entitled "APPLICATION PORTABILITY AND EXTENSIBILITY THROUGH DATABASE SCHEMA AND QUERY ABSTRACTION", which is hereby incorporated herein in its entirety.

BACKGROUND OF THE INVENTION

1. Field of the Invention

The present invention generally relates to creation of queries against databases and, more particularly, to creation of queries that are suitable to identify relevant information from underlying databases.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

One difficulty when dealing with queries against databases is ensuring the validity and accuracy of query results that are returned from the databases in response to execution of the queries. Specifically, it must be ensured that no relevant information from the databases is missing in the returned query results. For instance, assume a query issued against a medical database of a hospital in order to identify patients having an undiagnosed condition, such as strep throat. Assume further that the symptoms of strep throat are fever, sore throat and body aches. Accordingly, a corresponding query can be issued against the medical database requesting information with respect to all patients having fever, sore throat and body aches in order to identify those patients having strep throat. An exemplary query is shown in Table I below, which, for simplicity, is described in natural language without reference to a particular query language.

TABLE I

| QUERY EXAMPLE | |
|---|---|
| 001 | FIND |
| 002 | Name, Age |
| 003 | FROM |
| 004 | Diagnoses |
| 005 | WHERE |
| 006 | Body Temperature > 99.5° F. AND |
| 007 | Sore Throat = Yes AND |
| 008 | Body Aches = Yes |

Illustratively, the exemplary query shown in Table I is designed to retrieve data records (lines 001-002) from a Diagnoses database table (lines 003-004) which satisfy all query conditions defined in lines 005-008. More specifically, the exemplary query of Table I is configured to retrieve name and age (line 002) of patients with a body temperature of more than 99.5° F., a sore throat and body aches (lines 006-008).

However, one or more strep throat patients may not show all three symptoms. For instance, several patients may have taken some aspirin before coming to the hospital so that their body temperature is less than 99.5° F. Accordingly, information with respect to these patients will not be retrieved by the exemplary query of Table I, as these patients do not satisfy all conditions defined in lines 006-008 of the exemplary query. Thus, the returned query result would be inaccurate due to a lack of relevant information.

Therefore, there is a need for an efficient technique for creating queries against databases which allows identification of relevant information therefrom.

SUMMARY OF THE INVENTION

The present invention generally is directed to a method, system and article of manufacture for creating queries against databases and, more particularly, for creating queries that are suitable to identify relevant information from one or more underlying databases.

One embodiment provides a method of composing a query against data in a database. The method comprises receiving a query having one or more result fields and a plurality of query conditions. Each query condition defines selection criteria for selection of data records from the database. Each selected data record has data that satisfies at least one of the plurality of query conditions. Each of the plurality of query conditions has an associated weight. The method further comprises receiving an accuracy threshold for qualifying data records. The accuracy threshold defines a requested minimum accuracy of each selected data record defining a qualifying data record forming part of a valid result set returned for the query. For each selected data record, it is determined whether the accuracy threshold is satisfied with respect to a cumulative weight of those weighted query conditions that are satisfied.

Another embodiment provides a computer-readable medium containing a program which, when executed by a processor, performs operations for executing a query against data in a database. The operations comprise receiving a query having one or more result fields and a plurality of query conditions. Each query condition defines selection criteria for selection of data records from the database. Each selected data record has data that satisfies at least one of the plurality of query conditions. Each of the plurality of query conditions has an associated weight. The operations further comprise executing the query against the data in the database, comprising identifying all selected data records from the database, and applying an accuracy threshold to each selected data record to determine whether the accuracy threshold is satisfied for the selected data record with respect to a cumulative weight of those weighted query conditions that are satisfied. Thereby, qualifying data records forming a valid result set for the query are determined, wherein the accuracy threshold defines a requested minimum accuracy of each qualifying data record. The operations further comprise outputting the valid result set.

Still another embodiment provides a system, comprising: (i) a database having data defining a plurality of data records, (ii) a user interface for issuing a query against the database, and (iii) a query manager for executing the query against the database. The query has one or more result fields and a plurality of query conditions. Each query condition defines selection criteria for selection of data records from the database. Each selected data record has data that satisfies at least one of the plurality of query conditions. Each of the plurality of query conditions has an associated weight. The query manager is configured to (i) receive the query, (ii) identify all selected data records from the plurality of data records, (iii) apply an accuracy threshold to each selected data record to determine whether the accuracy threshold is satisfied for the selected data record with respect to a cumulative weight of those weighted query conditions that are satisfied, thereby determining qualifying data records forming a valid result set for the query, wherein the accuracy threshold defines a requested minimum accuracy of each qualifying data record; (iv) generate the valid result set on the basis of the determined qualifying data records, and (v) output the valid result set.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
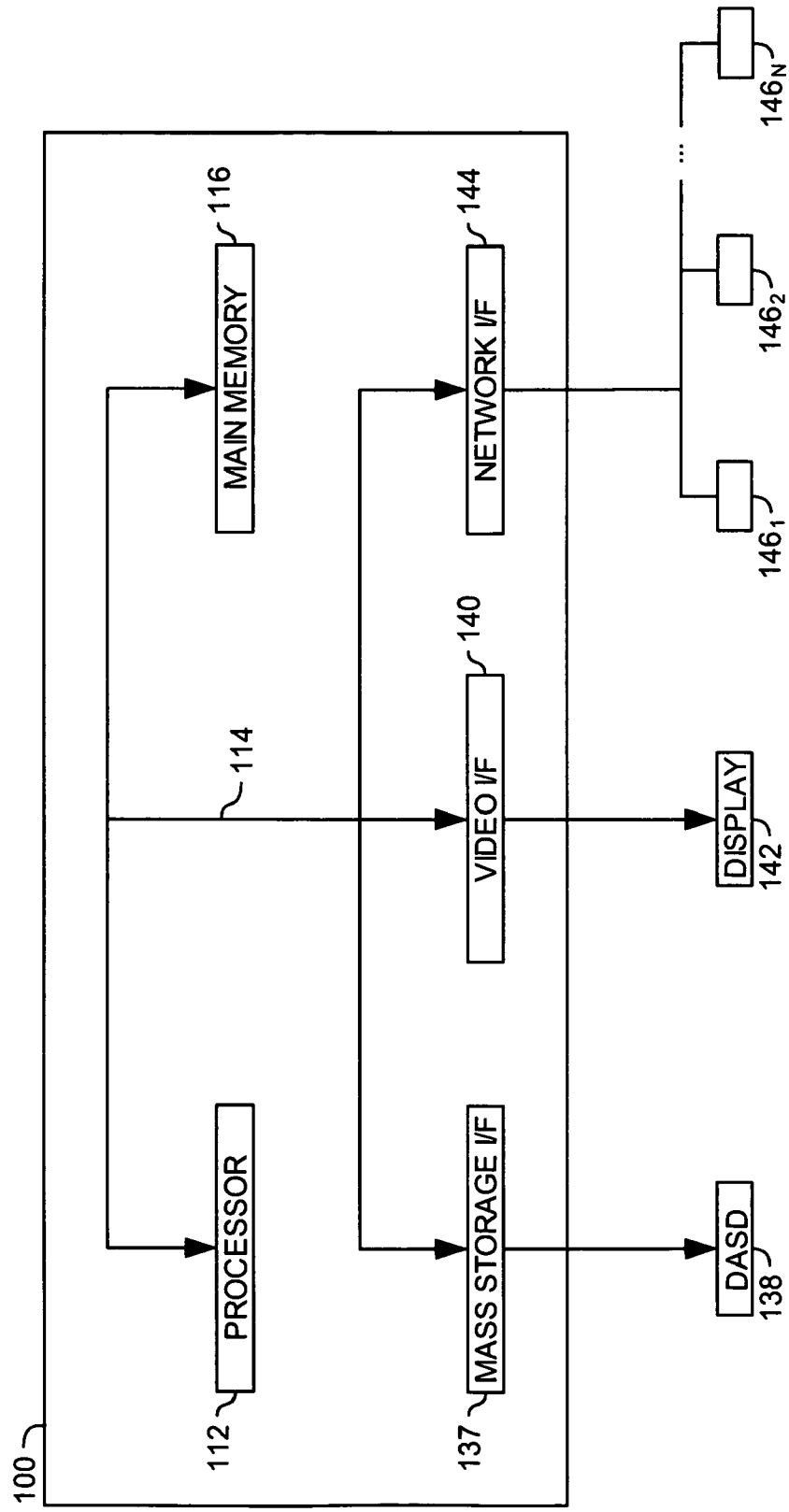
FIG. 1 is one embodiment of a computer system utilized in accordance with the invention.

The present invention generally is directed to a method, system and article of manufacture for creating and executing queries against databases and, more particularly, for creating and executing queries that are suitable to identify relevant information from one or more underlying databases. In general, a query against data in one or more underlying databases is issued by a requesting entity and includes one or more result fields and a plurality of query conditions. Each query condition defines selection criteria for selection of data records from the underlying database(s). Each selected data record has data for at least one of the one or more result fields which is returned to the requesting entity after execution of the query.

In one embodiment, a given query can be associated with a match quality value that characterizes the accuracy of a valid result set for the query. More specifically, the match quality value indicates to what extent a given data record needs to satisfy the plurality of query conditions of the given query so as to form part of the valid result set. A given data record that sufficiently satisfies the plurality of query conditions of the given query so as to form part of the valid result set may be referred to as a "qualifying data record". According to one aspect, the match quality value is implemented as an accuracy threshold which defines a requested minimum accuracy of each qualifying data record with respect to the plurality of query conditions.

When the given query is executed against the underlying database(s), data records which satisfy at least one query condition of the plurality of query conditions are identified. In one embodiment, each query condition of the plurality of query conditions is associated with a weight indicating a relative importance of the query condition with respect to at least a portion of the plurality of query conditions. Using the weights that are associated with the satisfied query conditions, an accuracy value can be determined for each identified data record on the basis of the satisfied query conditions. Each data record having an accuracy value that exceeds a predefined accuracy threshold is included with the valid result set for the given query as a qualifying data record. The valid result set is then returned to the requesting entity.

PREFERRED EMBODIMENTS

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

An Exemplary Query Creation and Execution Environment

Figure 2:
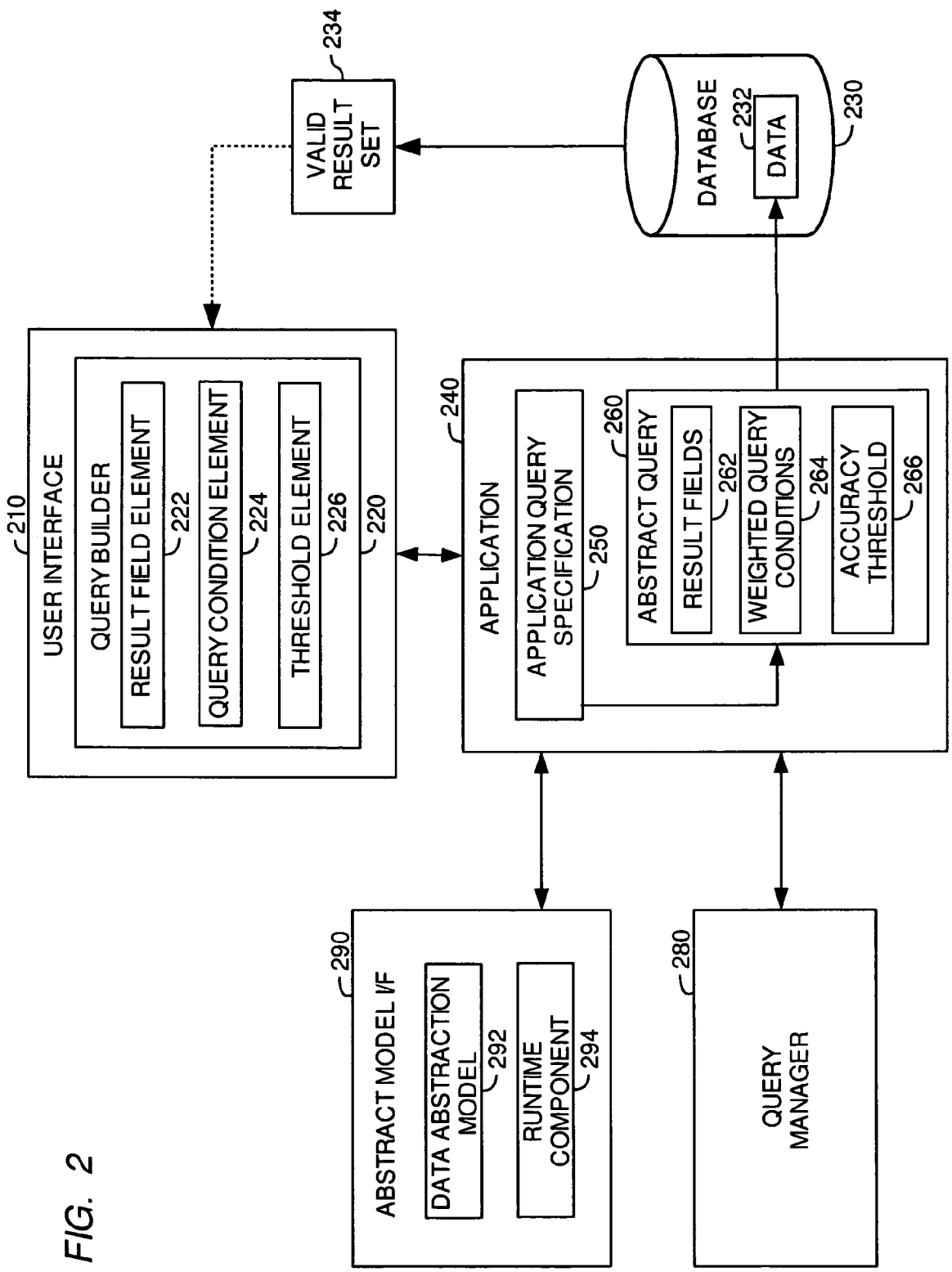
FIG. 2 is a relational view of software components of one embodiment of the invention.

Referring now to FIG. 2, a relational view of software components in one embodiment is illustrated. The software components illustratively include a user interface 210, a database 230, one or more applications 240 (only one application is illustrated for simplicity), a query manager 280 and an abstract model interface 290.

According to one aspect, the application 240 (and more generally, any requesting entity including, at the highest level, users) issues queries against data 232 in the database 230. The database 230 is shown as a single database for simplicity. However, a given query can be executed against multiple databases which can be distributed relative to one another. Moreover, one or more databases can be distributed to one or more networked devices (e.g., networked devices 146 of FIG. 1). The database 230 is representative of any collection of data regardless of the particular physical representation of the data. A physical representation of data defines an organizational schema of the data. By way of illustration, the database 230 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries (referred to herein as "abstract queries") issued by the application 240 are composed using the abstract model interface 290. The abstract queries are transformed into a form consistent with the physical representation of the data 232 for execution against the database 230. In the illustrated example, an abstract query 260 is created on the basis of logical fields defined by a data abstraction model 292. By way of example, the abstract query 260 is translated by a runtime component 294 into a concrete (i.e., executable) query which is executed against the data 232 of the database 230 to determine a valid result set 234 for the abstract query 260. The abstract model interface 290 is further described below with reference to FIGS. 3-6.

In general, the queries issued by the application 240 are defined according to an application query specification 250 and may be predefined (i.e., hard coded as part of the application 240) or generated in response to input (e.g., user input). The application query specification(s) 250 is also further described below with reference to FIGS. 3-6.

Illustratively, the queries issued by the application 240 are created by users using the user interface 210, which can be any suitable user interface configured to create/submit queries. However, it should be noted that the user interface 210 is only shown by way of example; any suitable requesting entity may create and submit queries against the database 230 (e.g., the application 240, an operating system or an end user). Accordingly, all such implementations are broadly contemplated.

According to one aspect, the user interface 210 is a graphical user interface that displays a query builder component 220 having a result field element 222, a query condition element 224 and a threshold element 226. The result field element 222 is configured to allow user selection of result fields for the abstract query 260 for which data is to be returned from the database 230. The query condition element 224 is configured to allow user specification of query conditions. Each query condition defines selection criteria for selection of data records from the database 230 having data for at least one of the selected result fields. The threshold element 226 is configured to allow user specification of an accuracy threshold defining a requested minimum accuracy of each selected data record defining a qualifying data record. In other words, the accuracy threshold defines whether a selected data record which satisfies at least one of the specified query conditions is a qualifying data record even if the selected data record does not satisfy all specified query conditions. All qualifying data records define the valid result set 234 with respect to all specified query conditions of the abstract query 260. An exemplary user interface is described in more detail below with reference to FIGS. 9-12.

The abstract query 260 is generated on the basis of the selected result fields, the specified query conditions and the specified accuracy threshold by the application 240 using the query manager 280. More specifically, the query manager 280 generates a result field specification 262 on the basis of the selected result fields. Furthermore, in one embodiment, the query manager 280 associates a weight with each of the specified query conditions to generate weighted query conditions for a corresponding selection criteria specification 264. The weight of a given query condition indicates a relative importance of the query condition with respect to one or more other query conditions. Each weight can be determined according to predefined database settings and/or on the basis of user input, as explained in more detail below with reference to FIG. 12. In one embodiment, even where a given weight is predefined by a database setting, the user may elect to override the predefined weight. The query manager 280 further generates an accuracy threshold specification 270 which is indicative of the specified accuracy threshold. The query manager 280 includes the result field specification 262, the selection criteria specification 264 and the accuracy threshold specification 270 with the abstract query 260.

In one embodiment, the query manager 280 executes the abstract query 260 against the data 232 in the database 230 using the runtime component 294 to determine the valid result set 234. Interaction and operation of the application 240, the abstract model interface 290, the query manager 280 and the user interface 210 for creation and execution of the abstract query 260 against the database 230 to determine the valid result set 234 is explained in more detail below with reference to FIGS. 7-12.

Logical/Runtime View of Environment

Figure 3:
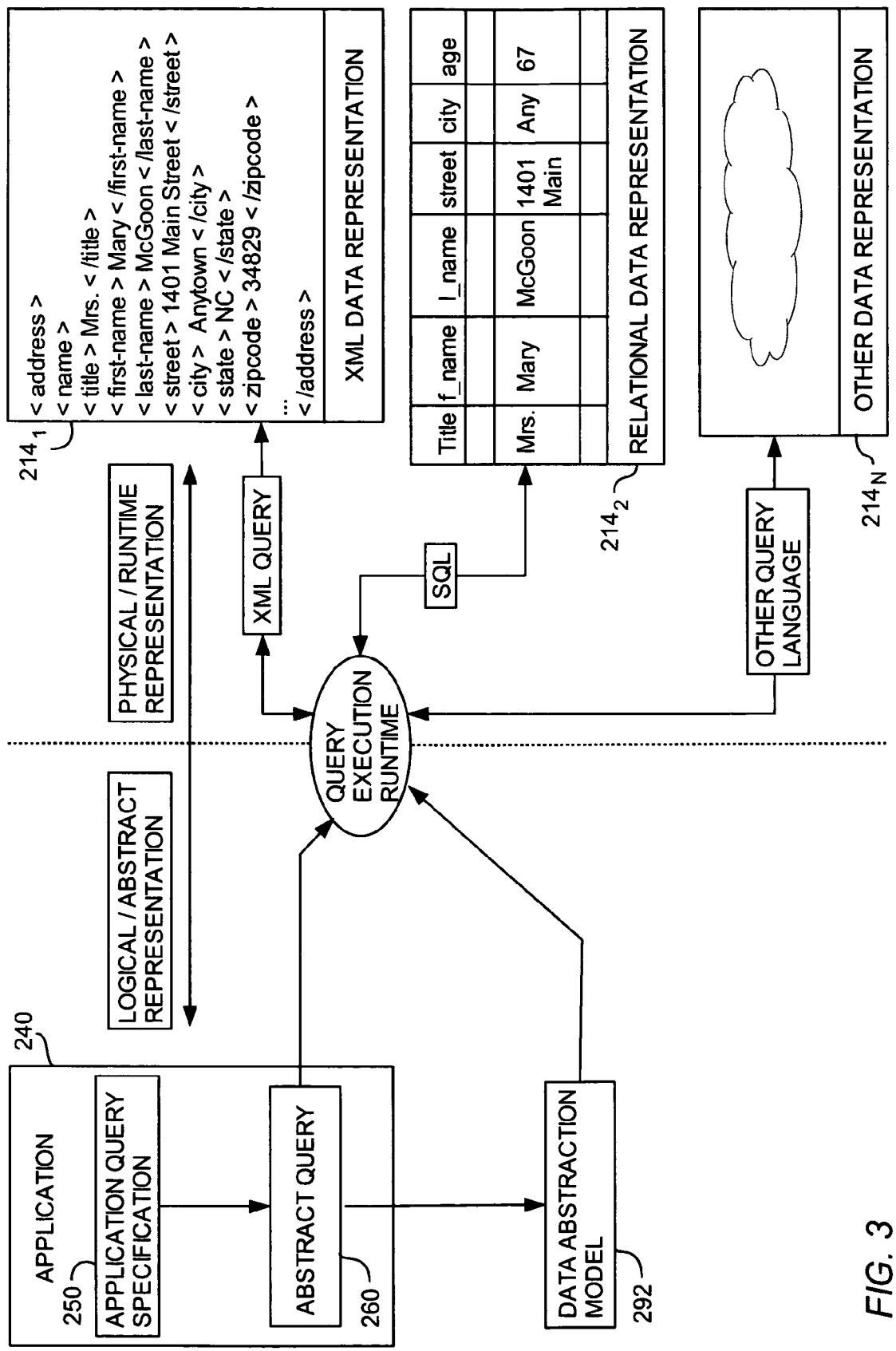
FIGS. 3-4 are relational views of software components in one embodiment.
Figure 4:
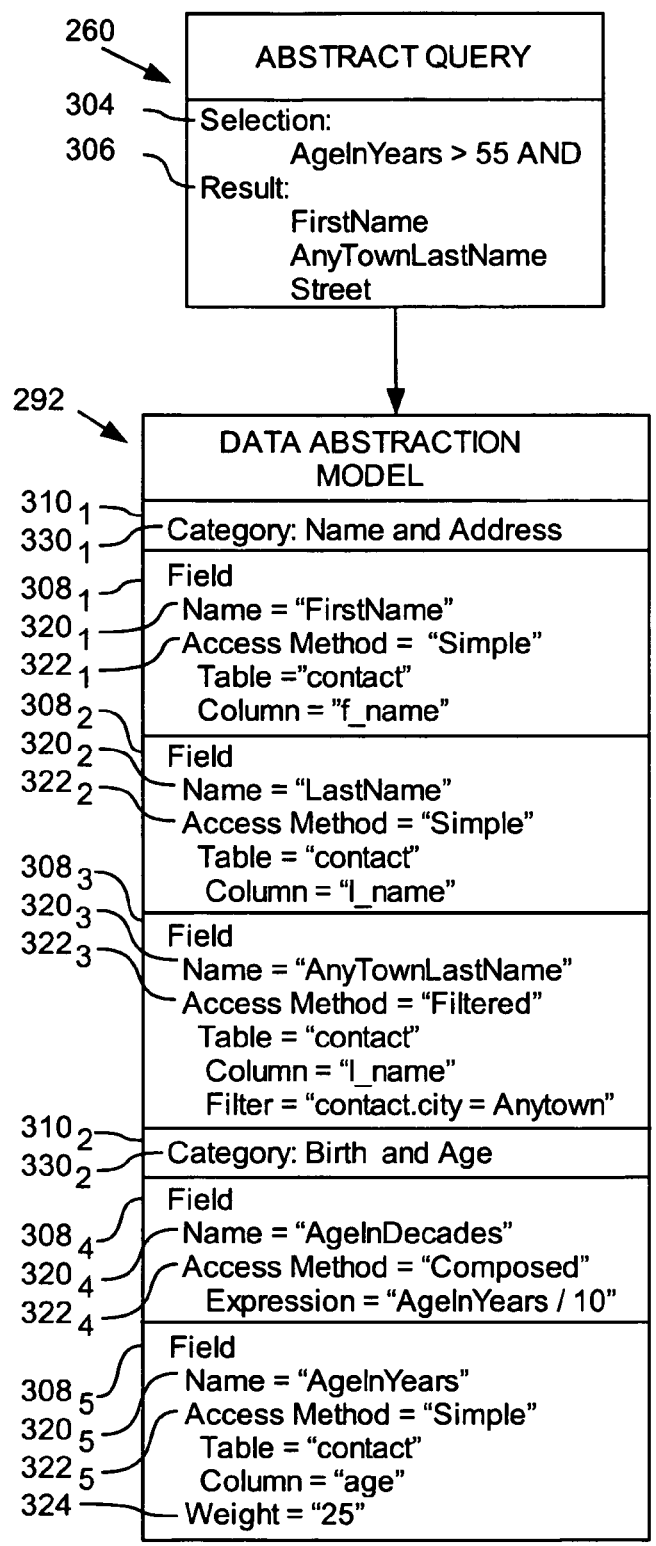

FIGS. 3-4 show an illustrative relational view of the applications 240, the application query specifications 250 and the data abstraction model 292 of FIG. 2 and other components of the invention. A requesting entity (e.g., one of the applications 240) issues the query 260 as defined by the respective application query specification 250 of the requesting entity. The resulting query 260 is generally referred to herein as an "abstract query" because the query is composed according to abstract (i.e., logical) fields rather than by direct reference to the underlying physical data entities in the database 230 of FIG. 2. As a result, abstract queries may be defined that are independent of the particular underlying data representation used. In one embodiment, the application query specification 250 may include both criteria used for data selection (selection criteria 304) and an explicit specification of the fields to be returned (return data specification 306) based on the selection criteria 304, as illustrated in FIG. 4.

As was noted above, the logical fields specified by the application query specification 250 and used to compose the abstract query 260 are defined by the data abstraction model 292. In general, the data abstraction model 292 exposes information as a set of logical fields that may be used within a query (e.g., the abstract query 260) issued by the application 240 to specify criteria for data selection and specify the form of result data returned from a query operation. The logical fields are defined independently of the underlying data representation being used in a corresponding database (e.g., database 230 of FIG. 2), thereby allowing queries to be formed that are loosely coupled to the underlying data representation.

In one embodiment, illustrated in FIG. 4, the data abstraction model 292 comprises a plurality of field specifications $308_1$, $308_2$, $308_3$, $308_4$ and $308_5$ (five shown by way of example), collectively referred to as the field specifications 308 (also referred to hereinafter as "field definitions"). Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). The field specification $308_5$ further includes an exemplary weight attribute 324 which indicates a relative importance of this logical field when used as condition field in a corresponding query condition, as explained in more detail below. Each attribute may have a value. For example, logical field name attribute $320_1$ has the value "FirstName", access method attribute $322_1$ has the value "Simple", and weight attribute 324 has the value "25". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 292 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 230 of FIG. 2). As illustrated in FIG. 3, the access methods associate the logical field names to a particular physical data representation $214_1$, $214_2$, ... $214_N$ in the database. By way of illustration, two data representations are shown, an XML data representation $214_1$ and a relational data representation $214_2$. However, the physical data representation $214_N$ indicates that any other data representation, known or unknown, is contemplated. In one embodiment, a single data abstraction model 292 contains field specifications (with associated access methods) for two or more physical data representations 214. In an alternative embodiment, a different single data abstraction model 292 is provided for each separate physical data representation 214.

Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 4 maps the logical field name $320_1$ ("FirstName") to a column named "f_name" in a table named "contact". The field specification $308_3$ exemplifies a filtered field access method $322_3$. Filtered fields identify an associated physical entity and provide filters used to define a particular subset of items within the physical representation. An example is provided in FIG. 4 in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 4 the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 292 shown in FIG. 4 are representative of logical fields mapped to data represented in the relational data representation $214_2$ shown in FIG. 3. However, other instances of the data abstraction model 292 map logical fields to other physical representations, such as XML.

An illustrative abstract query corresponding to the abstract query 260 shown in FIG. 4 is shown in Table II below. By way of illustration, the illustrative abstract query is defined using XML. However, any other language may be used to advantage.

TABLE II

ABSTRACT QUERY EXAMPLE

| | |
|---|---|
| 001 | <?xml version="1.0"?> |
| 002 | <!-- Query string representation: (AgeInYears > "55"--> |
| 003 | <QueryAbstraction> |
| 004 |   <Selection> |
| 005 |     <Condition internalID="4"> |
| 006 |       <Condition field="AgeInYears" operator="GT" value="55" |
| 007 |         internalID="1"/> |
| 008 |   </Selection> |
| 009 |   <Results> |
| 010 |     <Field name="FirstName"/> |
| 011 |     <Field name="AnyTownLastName"/> |
| 012 |     <Field name="Street"/> |
| 013 |   </Results> |
| 014 | </QueryAbstraction> |

Illustratively, the abstract query shown in Table II includes a selection specification (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 292 shown in FIG. 4 is shown in Table III below. By way of illustration, the illustrative Data Abstraction Model is defined using XML. However, any other language may be used to advantage.

TABLE III

DATA ABSTRACTION MODEL EXAMPLE

```
001   <?xml version="1.0"?>
002   <DataAbstraction>
003       <Category name="Name and Address">
004           <Field queryable="Yes" name="FirstName" displayable="Yes">
005               <AccessMethod>
006                   <Simple columnName="f_name" tableName="contact"></Simple>
007               </AccessMethod>
008           </Field>
009           <Field queryable="Yes" name="LastName" displayable="Yes">
010               <AccessMethod>
011                   <Simple columnName="l_name" tableName="contact"></Simple>
012               </AccessMethod>
013           </Field>
014           <Field queryable="Yes" name="AnyTownLastName" displayable="Yes">
015               <AccessMethod>
016                   <Filter columnName="l_name" tableName="contact"
017                       "contact.city=Anytown"> </Filter>
018               </AccessMethod>
019           </Field>
020       </Category>
021       <Category name="Birth and Age">
022           <Field queryable="Yes" name="AgeInDecades" displayable="Yes">
023               <AccessMethod>
024                   <Composed columnName="age" tableName="contact"
025                           Expression="columnName/10"> </Composed>
026               </AccessMethod>
027           </Field>
028           <Field queryable="Yes" name="AgeInYears" displayable="Yes">
029               <AccessMethod>
030                   <Simple columnName="age" tableName="contact"></Simple>
031               </AccessMethod>
032           </Field>
033       </Category>
034   </DataAbstraction>
```

By way of example, note that lines 004-008 correspond to the first field specification $308_1$ of the DAM 292 shown in FIG. 4 and lines 009-013 correspond to the second field specification $308_2$.

As was noted above, the abstract query of Table II can be transformed into a concrete query for query execution. An exemplary method for transforming an abstract query into a concrete query is described below with reference to FIGS. 5-6.

Transforming an Abstract Query into a Concrete Query

Figure 5:
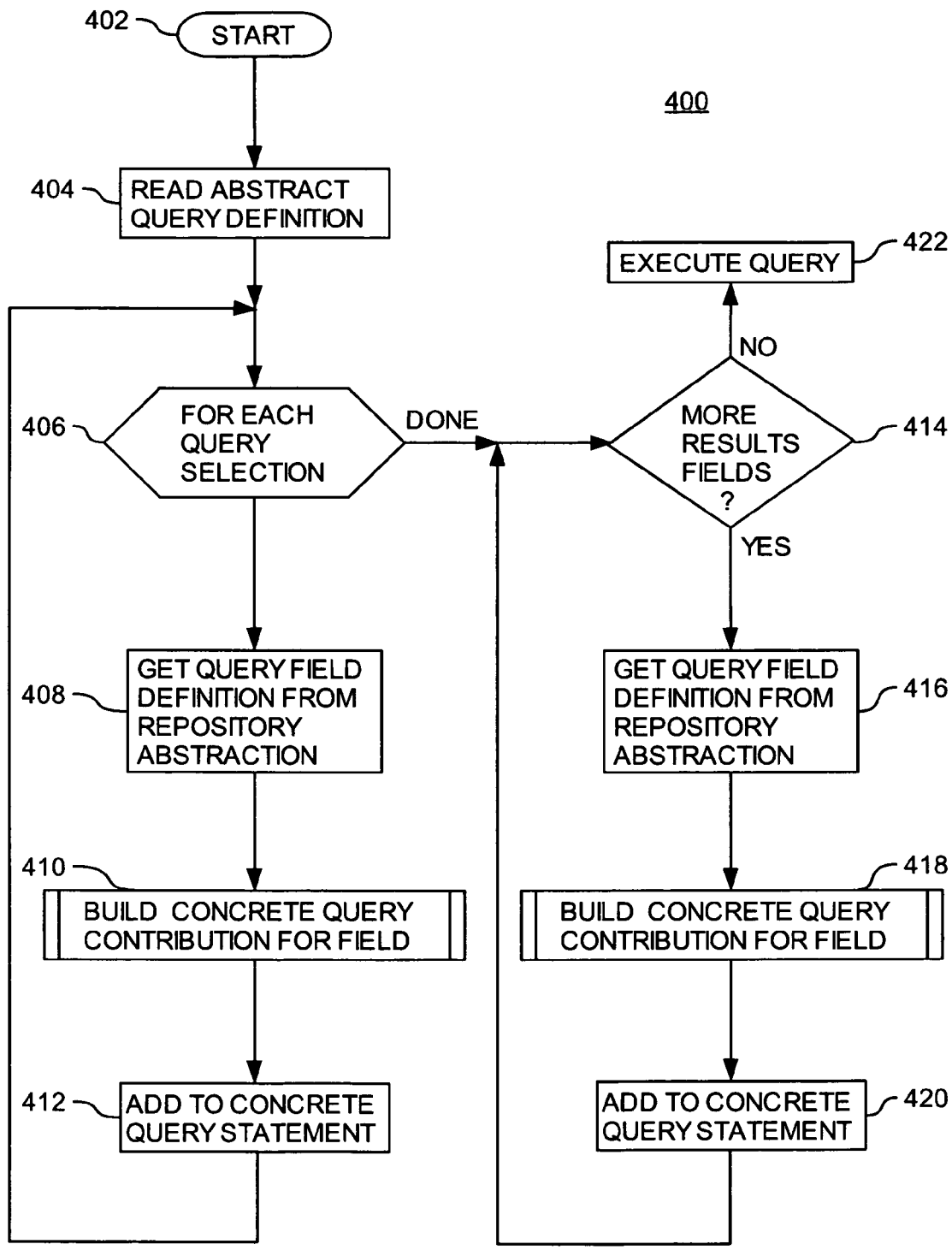
FIGS. 5-6 are flow charts illustrating the operation of a query manager.

Referring now to FIG. 5, an illustrative runtime method 400 exemplifying one embodiment of the operation of the runtime component 294 of FIG. 2 is shown. The method 400 is entered at step 402 when the runtime component 294 receives as input an abstract query (such as the abstract query shown in Table II). At step 404, the runtime component 294 reads and parses the abstract query and locates individual selection criteria and desired result fields. At step 406, the runtime component 294 enters a loop (defined by steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 294 uses the field name from a selection criterion of the abstract query to look up the definition of the field in the data abstraction model 292. As noted above, the field definition includes a definition of the access method used to access the data structure associated with the field. The runtime component 294 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 230 shown in FIG. 2. The concrete query contribution generated for the current field is then added to a concrete query statement (step 412). The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 294 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 294 looks up a result field name (from the result specification of the abstract query) in the data abstraction model 292 and then retrieves a result field definition from the data abstraction model 292 to identify the physical location of data to be returned for the current logical result field. The runtime component 294 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 6:
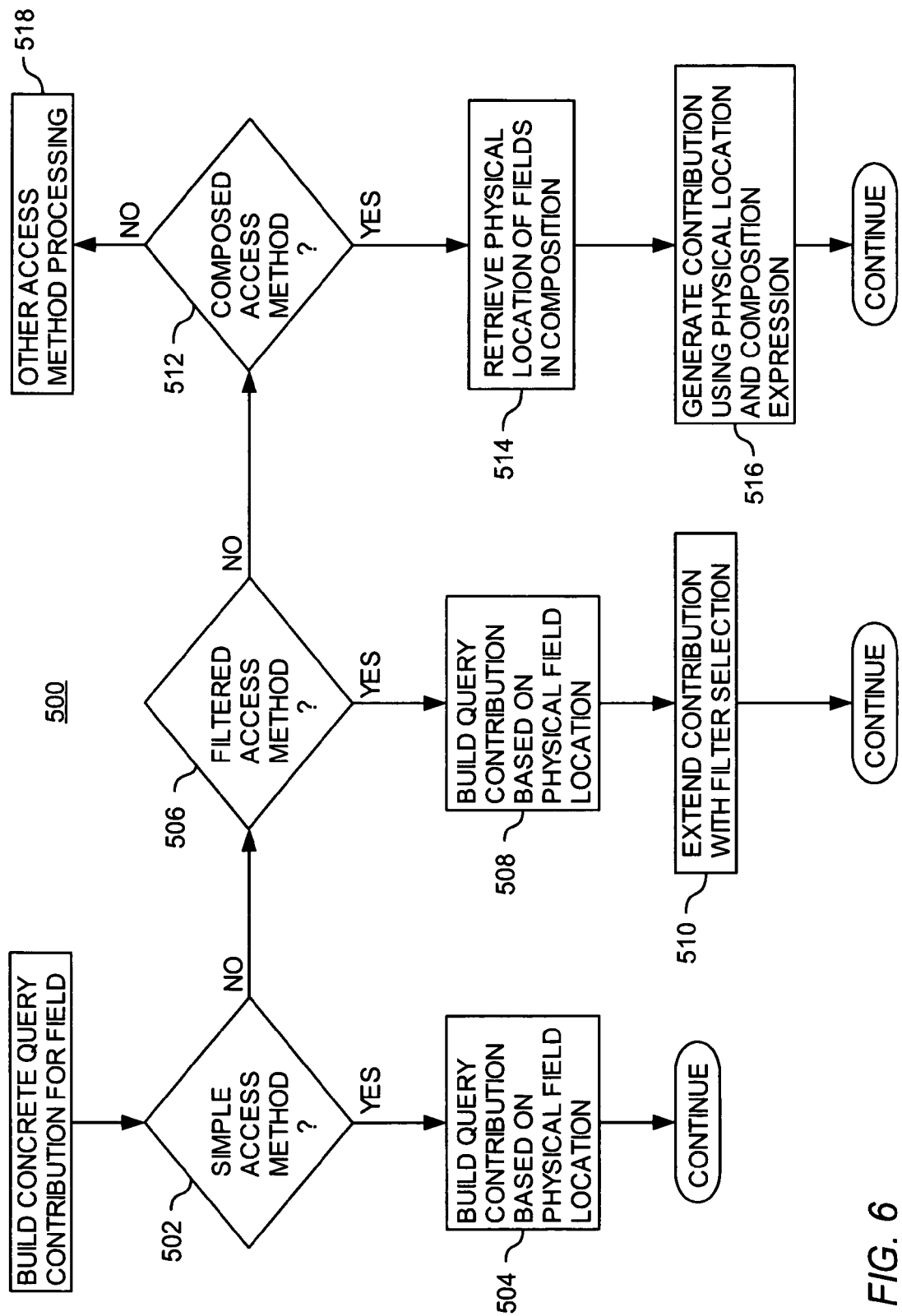

One embodiment of a method 500 for building a concrete query contribution for a logical field according to steps 410 and 418 is described with reference to FIG. 6. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

Creating Abstract Queries with Accuracy Thresholds

Figure 7:
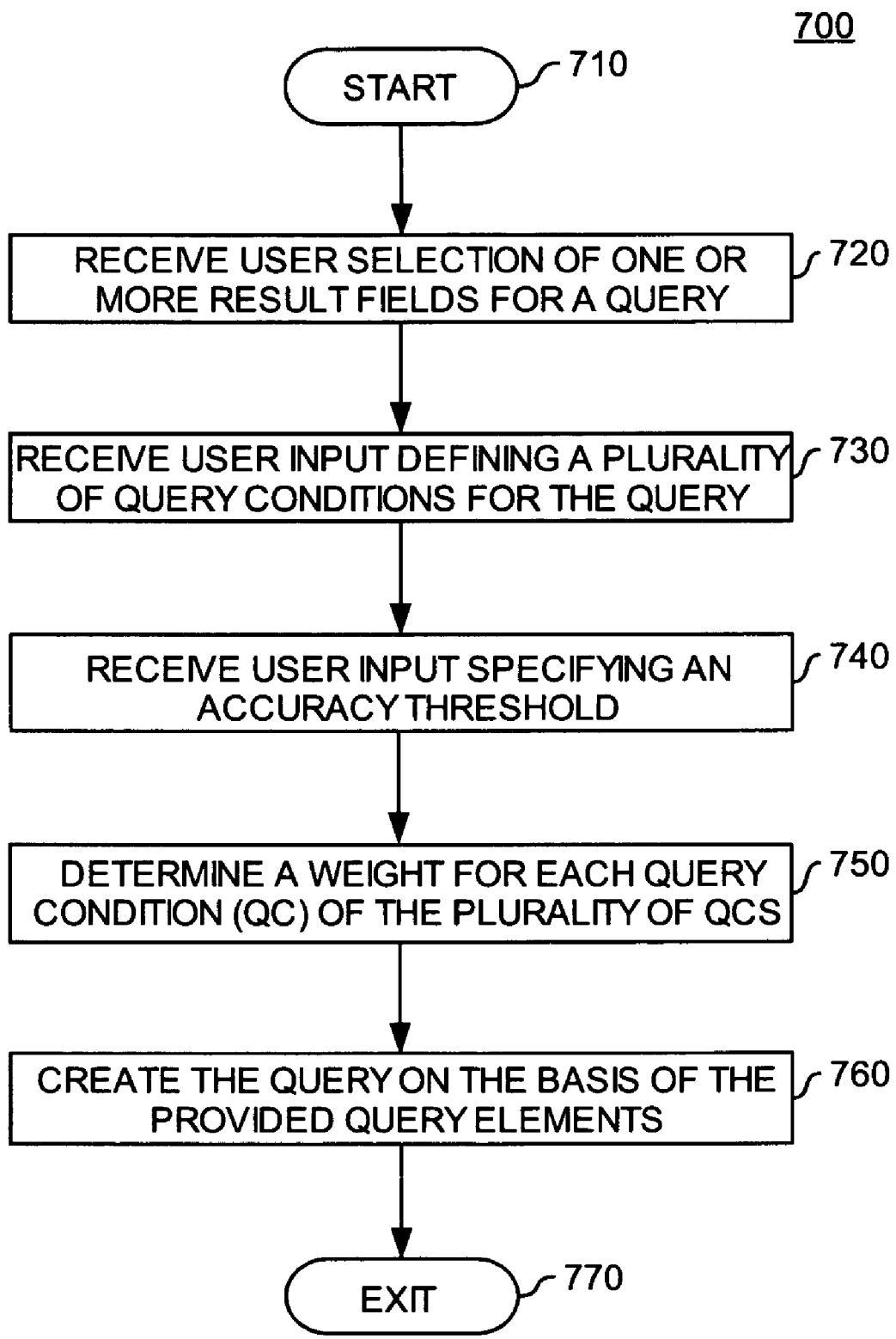
FIG. 7 is a flow chart illustrating a method of creating a query in one embodiment.

Referring now to FIG. 7, one embodiment of a method 700 for creating an abstract query (e.g., abstract query 260 of FIG. 2) against an underlying database (e.g., database 230 of FIG. 2) is illustrated. In one embodiment, at least part of the steps of the method 700 are performed by the query manager 280 of FIG. 2. Furthermore, at least several steps of the method 700 can be performed on the basis of user input received via a suitable user interface (e.g., user interface 210 of FIG. 2). Method 700 starts at step 710.

At step 720, user selection of one or more result fields for the abstract query is received. For instance, the user may select the one or more result fields from a plurality of user-selectable result fields displayed in a result field window of the user interface (e.g., result field element 222 of FIG. 2). An exemplary user interface illustrating selection of result fields is described below with reference to FIG. 9.

At step 730, user specification of a plurality of query conditions for the abstract query is received. For instance, the user may select a condition field for each query condition from a plurality of user-selectable condition fields displayed in a selection criteria window of the user interface (e.g., query condition element 224 of FIG. 2). The user may further use suitable graphical elements displayed in the selection criteria window to select a comparison operator (=, >, <, etc) for each query condition and to input a value expression to which the condition field of the query condition is compared to. An exemplary user interface illustrating specification of query conditions is described below with reference to FIG. 10.

At step 740, user specification of an accuracy threshold for the abstract query is received. For instance, the user may input a match quality value that characterizes a requested minimum accuracy of a valid result set (e.g., valid result set 234 of FIG. 2) for the abstract query into a corresponding input field displayed in the selection criteria window of the user interface (e.g., threshold element 226 of FIG. 2). More particularly, the match quality value indicates to what extent a given data record of the underlying database needs to satisfy the plurality of specified query conditions of the abstract query so as to form part of the valid result set. By way of example, the match quality value that defines the accuracy threshold is expressed as a percentage indicative of the minimum accuracy. An exemplary user interface allowing user specification of an accuracy threshold is described below with reference to FIG. 10.

In one embodiment, the user may define separate accuracy thresholds for different subsets of query conditions of the plurality of query conditions. For instance, the user may define a first accuracy threshold for a first subset of query conditions and a second accuracy threshold for a second subset of query conditions and so forth. More specifically, assume that an abstract query is issued against a medical database of a hospital in order to determine female patients having had either undiagnosed broken bones or undiagnosed arthritis. Assume further that these patients are to be determined from a multiplicity of patients having had symptoms of strep throat, independent on whether strep throat has been diagnosed for these patients or not. An exemplary query is shown in Table IV below, which, for simplicity, is described in natural language without reference to a particular query language.

TABLE IV

| QUERY EXAMPLE | |
|---|---|
| 001 | FIND |
| 002 | Female Patients |
| 003 | WITH |
| 004 | (Broken Bones OR Arthritis) AND |
| 005 | Strep Throat |

Illustratively, the exemplary query shown in Table IV is designed to retrieve data records for female patients that had strep throat and at least one of broken bones or arthritis.

However, assume now that a doctor wants to issue the query of Table IV to particularly identify those female patients that satisfy the specified conditions of broken bones/arthritis and strep throat but who were not formally diagnosed so that a diagnosis does not exist (e.g., in an underlying "Diagnoses" table). As a result, searching directly on the basis of field values for broken bones, arthritis and strep throat is not possible. The doctor must therefore search on the basis of related criteria to determine patient records which satisfy the query of Table IV.

For instance, assume that broken bones can be diagnosed on the basis of three separate symptoms: limp, aching pain, and sharp pain. Assume further that existence of any two of these symptoms for a given patient is stipulated to be sufficient for a broken bone diagnosis. Accordingly, if each symptom is weighted with a weight of 0.33, then the accuracy threshold is set to a value greater than 0.33. Illustratively, the accuracy threshold is set to 0.60, or 60%. Weighting of query conditions is described in more detail below with reference to step 750 of method 700. Assume further, that for arthritis another set of three separate symptoms is applied: "trouble in grasping objects", "weakness in the hands", "pain in the joints". Unlike the broken bones diagnosis, either "pain in the joints" alone or "trouble in grasping objects" and "weakness in the hands" together is stipulated to be sufficient for an arthritis diagnosis. Thus, if "pain in the joints" is associated with a weight of 0.5 and each one of "trouble in grasping objects" and "weakness in the hands" is associated with a weight of 0.25, then the accuracy threshold for arthritis diagnosis is set to 50%. Assume finally that strep throat can also be diagnosed on the basis of three separate symptoms: a body temperature greater than 99.5° F., sore throat and body aches.

Assume now that the abstract query shown in Table V below is created to determine qualifying data records for the exemplary query of Table IV above from a Diagnoses table. For simplicity, the abstract query of Table V is described in natural language without reference to a particular query language.

TABLE V

QUERY EXAMPLE

| | |
|---|---|
| 001 | FIND |
| 002 | Name, Age |
| 003 | FROM |
| 004 | Diagnoses |
| 005 | WHERE |
| 006 | ( |
| 007 | { symptom = 'limp' (Weight 0.33), |
| 008 | symptom = 'aching pain' (Weight 0.33), |
| 009 | symptom = 'sharp pain' (Weight 0.33) } |
| 010 | ACCURACY [threshold = 60%] |
| 011 | OR |
| 012 | { symptom = 'trouble grasping' (Weight 0.25), |
| 013 | symptom = 'weak hands' (Weight 0.25), |
| 014 | symptom = 'painful joints' (Weight 0.5) } |
| 015 | ACCURACY [threshold = 50%] |
| 016 | ) |
| 017 | AND |
| 018 | { body temperature > 99.5° F., |
| 019 | symptom ='sore throat', |
| 020 | symptom = 'body aches' } |
| 021 | AND |
| 022 | Gender = 'Female' |

Illustratively, the exemplary query shown in Table V performs a statistical analysis of symptoms of female patients having associated data records in the "Diagnoses" table (line 004) in order to identify patients having at least one of broken bones or arthritis (line 007-016), and strep throat (lines 018-021). It should be noted that the strep throat symptoms in lines 018-021 are not associated with corresponding weights and that the strep throat diagnosis is not performed with respect to an associated accuracy threshold. In this case, corresponding weights and a suitable accuracy threshold can be set automatically as described below, e.g., on the basis of predefined database settings. For instance, each of the symptoms can be associated with an identical weight of 0.33 and the accuracy threshold can be set to 60% so that each two occurring symptoms result in a strep throat diagnosis.

At step 750, a weight is determined for each query condition of the plurality of specified query conditions. In one embodiment, the query manager determines corresponding weights on the basis of predefined database settings. By way of example, the weights can be retrieved from logical fields corresponding to the condition fields of the specified query conditions, as explained above with reference to FIG. 4. Alternatively, the query manager may associate each query condition of the plurality of specified query conditions with an equal weight.

In another embodiment, the user may define a weight for at least a portion of the plurality of specified query conditions. Thus, the user may indicate a relative importance of one or more given query conditions with respect to one or more other query conditions of the plurality of specified query conditions. To this end, the selection criteria window of the user interface may display suitable graphical elements which allow user specification of a weight for one or more query conditions of the plurality of specified query conditions. An exemplary user interface illustrating specification of query condition weights is described below with reference to FIG. 12. It is also contemplated that a user may override any predefined weights assigned by the query manager.

At step 760, the abstract query is created on the basis of all query elements which have been selected/specified using the suitable user interface. In other words, a result field specification, a selection criteria specification and an accuracy threshold specification are generated on the basis of the selected result field(s), the specified query conditions and the specified accuracy threshold(s) and included with the abstract query, as explained above with reference to FIG. 2. Method 700 then exits at step 770.

It should be noted that the order of the steps of the method 700 shown in FIG. 7 should not be construed as limiting of the invention. For instance, in one embodiment the abstract query can be created stepwise. Accordingly, the result field specification can be created when selection of the result fields at step 720 is completed, so that the result field specification can be included with the abstract query before or during user specification of the query conditions at step 730. Similarly, the selection criteria specification can be created when specification of the query conditions at step 730 is completed, so that the selection criteria specification can be included with the abstract query before or during user specification of the accuracy threshold at step 740. Furthermore, the weights can be associated with the query conditions upon specification of the query conditions at step 730. Moreover, instead of using a user-specified accuracy threshold, a predefined accuracy threshold which is provided by corresponding database settings can be used. Accordingly, all such implementations are broadly contemplated.

An Exemplary Graphical User Interface

With reference now to FIGS. 9-12, an exemplary graphical user interface (GUI) 900 which is configured to receive and provide input data to at least several steps of the method 700 of FIG. 7 is described. The exemplary GUI 900 illustrates one embodiment of the user interface 210 of FIG. 2.

According to one aspect, the GUI 900 is configured for composing abstract queries, such as the abstract query 260 of FIG. 2, and displays a plurality of GUI screens. Each of the displayed GUI screens corresponds to one of the result field element 222, the query condition element 224 and the threshold element 226 of the query builder component 220 of FIG. 2.

Figure 9:
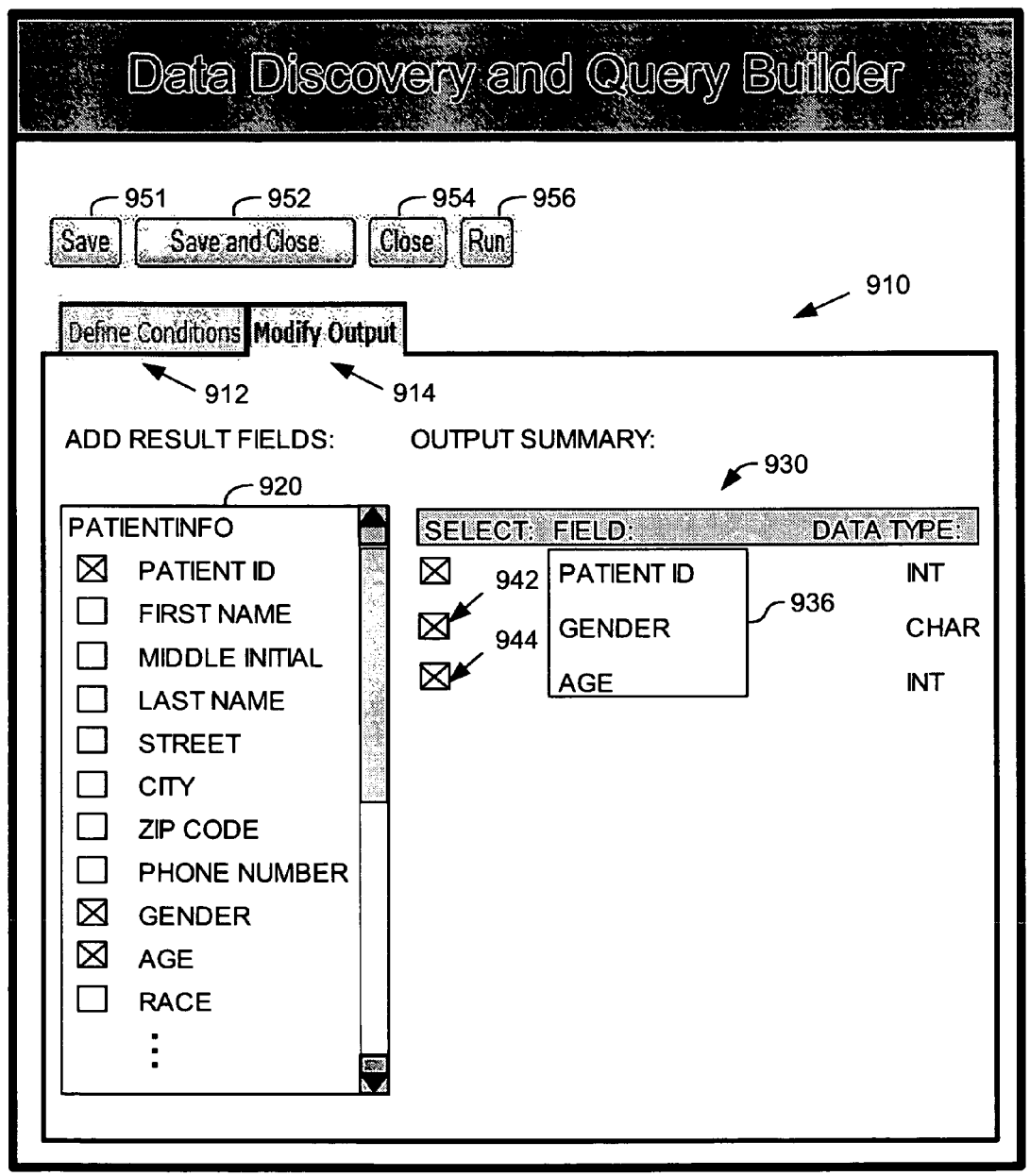
FIGS. 9-12 are screen shots illustrating user interfaces showing an exemplary query builder in one embodiment.

Referring first to FIG. 9, the illustrative GUI screen 900 is shown with two selectable tabs, a "Define Conditions" tab 912 and a "Modify Output" tab 914. When the "Modify Output" tab 914 is selected, a panel 910 for user selection of requested result fields for the abstract query is displayed. The panel 910 exemplifies the result field element 222 of the query builder component 220 of FIG. 2.

Illustratively, the panel 910 includes a result field window 920 displaying a list of user-selectable result fields and a display area 930 displaying summary information for the abstract query. In one embodiment, each user-selectable result field corresponds to a logical field of an underlying data abstraction model (e.g., data abstraction model 292 of FIG. 2).

The result field window 920 allows user selection of one or more of the result fields for the abstract query. The display area 930 illustratively includes a list 936 of result fields which have been selected for the abstract query from the result field window 920. Each selected result field has an associated checkbox. In other words, in response to selection of a result field from the result field window 920, a corresponding entry in the list 936 and an associated checkbox are displayed in the display area 930. Each checkbox can be clicked to confirm selection of the associated selected result field, i.e., to select the associated selected result field for use in the abstract query. For instance, when a checkbox 942 is clicked, a result field "Gender" is selected from the list 936 for use in the abstract query. When a checkbox 944 is clicked, a result field "Age" is selected from the list 936 for use in the abstract query.

After user-selection of all required result fields, the user may select the "Define Conditions" tab 912 to launch display of a GUI allowing for specification of required query conditions, as explained in more detail below with reference to FIG. 10. Thus, a plurality of query conditions can be specified for the abstract query.

Illustratively, the GUI screen 900 further includes four pushbuttons 951, 952, 954 and 956. By clicking the pushbutton 951 "Save", a query data object can be created for the abstract query and persistently stored. If the pushbutton 952 "Save and Close" is clicked, a query data object is created for the abstract query and persistently stored and the GUI screen 900 is closed. The pushbutton 954 "Close" can be used to close the GUI screen 900 without taking any further action. The pushbutton 956 "Run" can be used to initiate execution of the abstract query (e.g., the abstract query 260 of FIG. 2).

Figure 10:
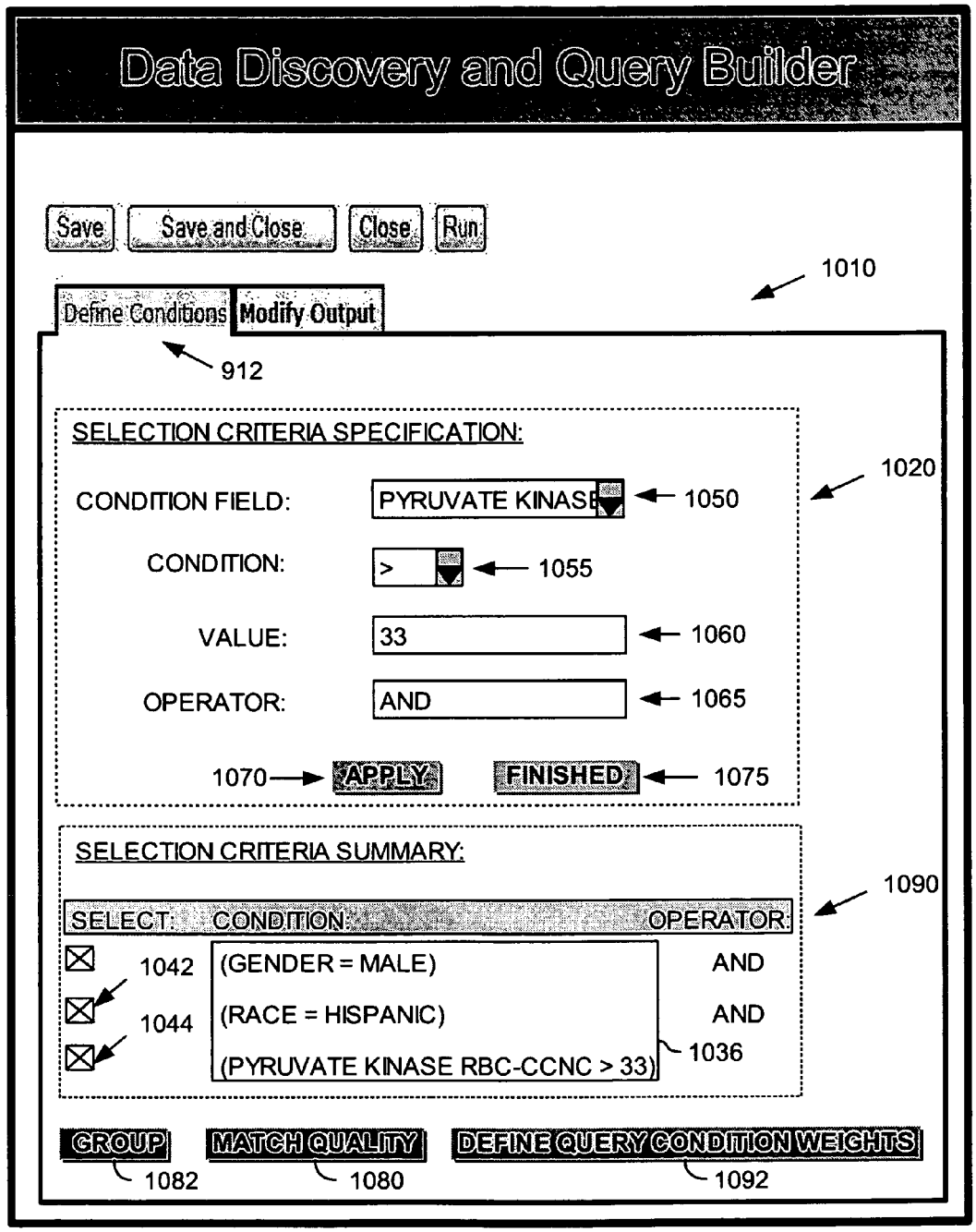

Referring now to FIG. 10, the illustrative GUI screen 900 of FIG. 9 is shown after selection of the "Define Conditions" tab 912. Accordingly, a panel 1010 for user specification of query conditions for the abstract query is displayed. The panel 1010 exemplifies the query condition element 224 of the query builder component 220 of FIG. 2.

Illustratively, the panel 1010 includes a selection criteria specification area 1020, a selection criteria summary area 1090 and graphical elements 1094 and 1080. The selection criteria specification area 1020 is adapted for specification of query conditions. To this end, one or more condition fields can be selected from a selection field 1050. In one embodiment, each selectable condition field corresponds to a logical field of an underlying data abstraction model (e.g., data abstraction model 292 of FIG. 2). For each selected condition field, a comparison operator can be determined using an operator selection field 1055 and a condition value can be assigned to the selected condition field using the value input field 1060. If more than one condition field is selected, the selected condition fields can be combined using operators, which can be selected from a selection field 1065. After specification of each query condition, a pushbutton 1070 "APPLY" can be clicked to indicate completion of the specification of the query condition. When the specification of all required query conditions is completed, a pushbutton 1075 "FINISHED" can be clicked to indicate the completion.

The selection criteria summary area 1090 illustratively includes a list 1036 of query conditions which have been specified for the abstract query using the selection criteria specification area 1020. Each specified query condition has an associated checkbox. In other words, in response to specification of a query condition in the selection criteria specification area 1020 and a click on the "APPLY" button 1070, a corresponding entry in the list 1036 and an associated checkbox are displayed in the selection criteria summary area 1090. Each checkbox can be clicked to confirm use of the associated specified query condition, i.e., to select the associated selected query condition for use in the abstract query. For instance, when a checkbox 1042 is clicked, a query condition "(Race=Hispanic)" is selected from the list 1036 for use in the abstract query. When a checkbox 1044 is clicked, a query condition "(Pyruvate Kinase RBC-cCnc>33)" is selected from the list 1036 for use in the abstract query. Furthermore, subsets of the query conditions can be selected to define groups of query conditions, hereinafter referred to as "accuracy groups", for brevity, as explained in more detail below.

In the given example, the checkboxes of all displayed query conditions from the list 1036 have been clicked. Assume now, that a pushbutton 1082 "GROUP" has been clicked to group these query conditions in a first accuracy group. A pushbutton 1080 "MATCH QUALITY" can then be clicked to initiate specification of a requested accuracy threshold for the first accuracy group. Accordingly, in one embodiment, a match quality specification window is launched, as explained below with reference to FIG. 11.

The user may further click a pushbutton 1092 "DEFINE QUERY CONDITION WEIGHTS" to initiate specification of query condition weights. Accordingly, in one embodiment, a weight specification window is launched, as explained below with reference to FIG. 12.

However, it should be noted that launching a separate match quality window for specification of a match quality and/or a separate weight specification window for specification of query condition weights is merely described by way of example and is not limiting of the invention. In other words, multiple implementations of a GUI that allows users to specify match qualities and weights for query conditions are possible. For instance, the selection criteria specification area 1020 may have a particular input field that allows for specification of a weight for each given query condition upon creation of the query condition. Accordingly, all such implementations are broadly contemplated. More generally, any implementation of a GUI that allows users to select result fields and to specify query conditions, query condition weights and/or accuracy thresholds is broadly contemplated.

Figure 11:
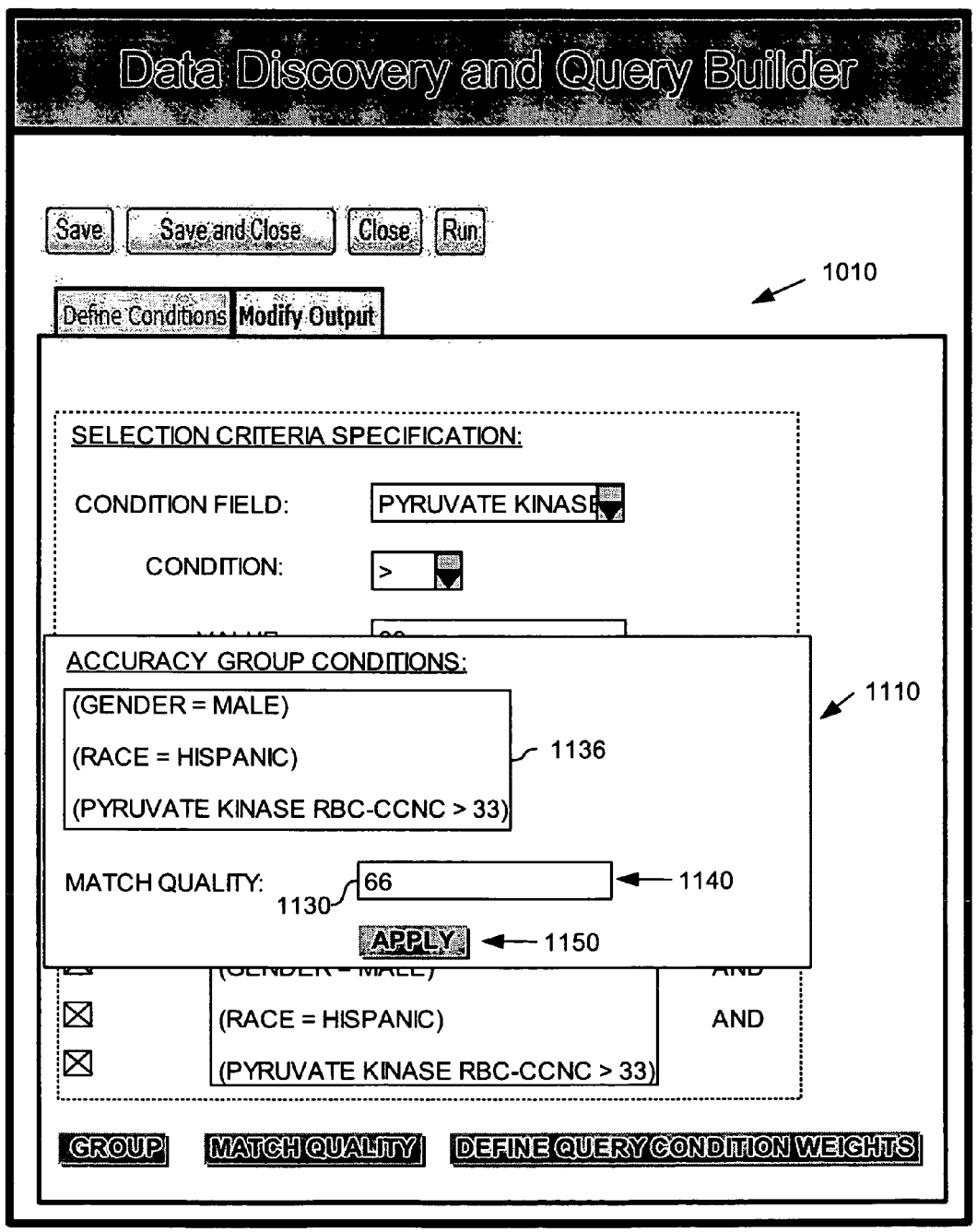

Referring now to FIG. 11, the illustrative GUI screen 900 of FIG. 10 is shown after launch of a match quality specification window 1110. Illustratively, the match quality specification window 1110 is shown as a pop-up window which superimposes at least a portion of the panel 1010 when the pushbutton 1080 of FIG. 10 is clicked.

More specifically, the match quality specification window 1110 exemplifies the threshold element 226 of the query builder component 220 of FIG. 2. Illustratively, the match quality specification window 1110 displays a list 1136 of all selected specified query conditions according to the list 1036 of FIG. 10, i.e., the query conditions defining the first accuracy group, and a match quality specification area 1140. The match quality specification area 1140 comprises an input field 1130 for input of the requested accuracy threshold. Illustratively, an accuracy threshold of "66" has been entered into the input field 1130, thereby defining a requested minimum accuracy of 66% for each qualifying data record. After specification of the requested match quality, a pushbutton 1150 "APPLY" can be clicked to indicate completion of the specification of the match quality. Display may then return to the illustrative GUI screen 900 of FIG. 10, where the pushbutton 1092 can be clicked to initiate specification of query condition weights, as described in more detail below.

Figure 12:
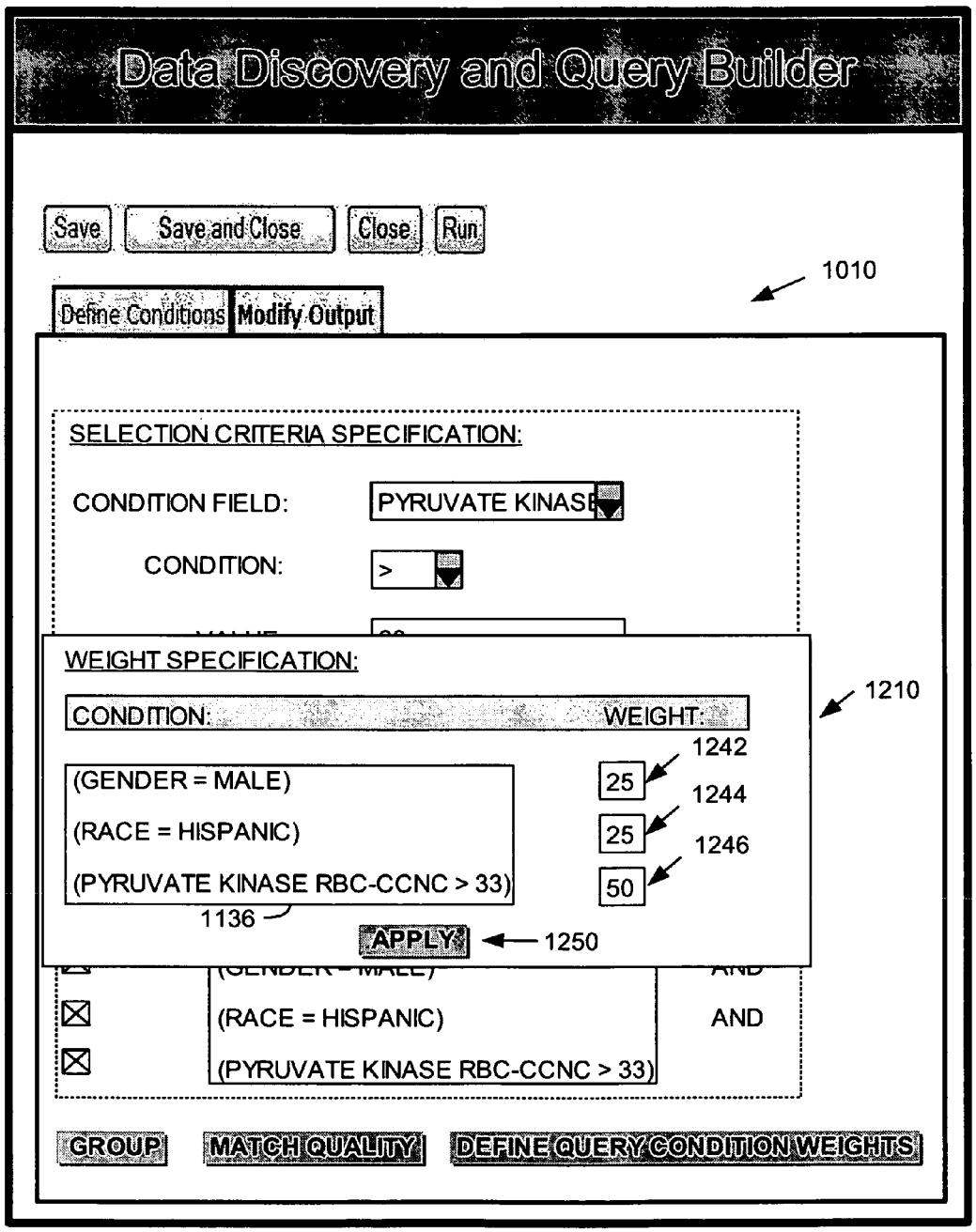

Referring now to FIG. 12, the illustrative GUI screen 900 of FIG. 10 is shown after launch of a weight specification window 1210. Illustratively, the weight specification window 1210 is shown as a pop-up window which superimposes at least a portion of the panel 1010 when the pushbutton 1092 of FIG. 10 is clicked.

Illustratively, the weight specification window 1210 displays the list 1136 of FIG. 11 according to the specified query conditions of the list 1036 of FIG. 10. Each specified query condition has an associated input field for input of a requested weight. The user may, thus, enter a weight into each one of the input fields for each one of the specified query conditions. In one embodiment, the accumulated weight of all query conditions is 100 corresponding to 100% of the query conditions. For instance, a value "25" has been entered into a first input field 1242 as weight for a query condition "(Gender=Male)". Furthermore, a value "25" has been entered into a second input field 1244 as weight for the query condition "(Race=Hispanic)". Finally, a value "50" has been entered into a third input field 1246 as weight for the query condition "(Pyruvate Kinase RBC-cCnc>33)". These three query condition weights have an cumulative weight of 100 (i.e., 25+25+50). Thus, a data record which satisfies, e.g., only the query condition "(Gender=Male)" has an accuracy of 25%. On the other hand, a data record which satisfies the query condition "(Race=Hispanic)" has an accuracy of 50%; and a data record which satisfies both query conditions "(Race=Hispanic)" and "(Gender=Male)" has a combined accuracy of 75%. After specification of the query condition weights, a pushbutton 1250 "APPLY" can be clicked to indicate completion of the specification the query condition weights. Display then returns to display of the panel 1010 according to FIG. 10. However, it should be noted that the cumulative weight of all query conditions is not necessarily 100 corresponding to 100% of the query conditions and that other arbitrary weightings may be defined.

Assume now that the exemplary abstract query shown in Table VI below is created using the GUI 900 of FIGS. 9-12. The exemplary abstract query of Table VI illustrates the abstract query 260 of FIG. 2, by way of example. For simplicity, the exemplary abstract query of Table VI is described in natural language without reference to a particular query language.

TABLE VI

| EXEMPLARY ABSTRACT QUERY |
|---|
| 001 FIND |
| 002    Patient ID, Gender, Age |
| 003 WHERE |
| 004    (Gender = Male; Weight = 25) |
| 005    (Race = Hispanic; Weight = 25) |
| 006    (Pyruvate Kinase RBC-cCnc > 33; Weight = 50) |
| 007 ACCURACY |
| 008    Threshold = 66 |

Illustratively, the exemplary query shown in Table VI includes three weighted query conditions (lines 004-006) and is designed to retrieve data records (line 002) which satisfy the weighted query conditions with a requested minimum accuracy of 66%. More specifically, the exemplary query of Table VI is configured to retrieve qualifying data records having patient identifier (Patient ID), gender and age information (line 002). According to the accuracy threshold defined in line 008 and the applicable weights associated with the query conditions according to lines 004-006, the qualifying data records are data records which satisfy the query condition of line 006 and at least one of the query conditions of lines 004-005, as explained in more detail below with reference to FIG. 8.

For execution, the exemplary abstract query of Table VI can be transformed into a concrete (i.e., executable) query shown in Table VII below. In one embodiment, the runtime component 294 of FIG. 2 is used to transform the exemplary abstract query of Table VI into the concrete query of Table VII. By way of illustration, the exemplary concrete query is defined using SQL. However, any other language may be used to advantage.

TABLE VII

| EXEMPLARY CONCRETE SQL QUERY |
|---|
| 001 SELECT |
| 002    Patient ID, Gender, Age |
| 003 FROM |
| 004    Tests T1 |
| 005 WHERE |
| 006    (CASE WHEN T1.Gender = "Male" THEN<br>   1 ELSE 0 END *.25)+ |
| 007    (CASE WHEN T1.Race = "Hispanic" THEN<br>   1 ELSE 0 END *.25)+ |
| 008    (CASE WHEN T1.Pyruvate Kinase RBC-cCnc > 33 THEN<br>   1 ELSE 0 END *.50) |
| 009    >= .66 |

As can be seen from lines 006-008, an indicative value is generated for each data record to which one of the query conditions is applied. In the illustrated example, the indicative value is a binary value corresponding to "1" if a corresponding one of the query conditions is satisfied, and "0" otherwise (i.e., if the corresponding query condition is not satisfied). For instance, according to line 006, when a given data record includes a gender "Male", the indicative value "1" is generated for the data record. Otherwise, the indicative value "0" is generated for the given data record. Then, the weight of the query condition is applied to the indicative value to determine an individual score for the given data record with respect to the query condition. In other words, according to line 006 the generated indicative value is multiplied with "0.25" which represents the weight of the query condition. Thus, if the gender is "Male", the indicative value "1" is multiplied with "0.25" and the individual score "0.25" is generated. Similarly, such an individual score is determined for the given data record with respect to each one of the query conditions in lines 006-008, resulting in three separate individual scores. All three individual scores are combined to a total score for the given data record to determine whether the given data record satisfies the requested minimum accuracy according to line 009. More specifically, the individual scores are summed up ("+" in lines 006-007) to the total score that defines an accuracy value which is compared to the accuracy threshold (">=0.66" in line 009).

As can further be seen from line 002 of Table VII, the exemplary concrete SQL query is executed against the database table "Tests". The database table has been identified using a corresponding data abstraction model (e.g., data abstraction model 292 of FIG. 2) used for transforming the exemplary query of Table VI into the concrete SQL query of Table VII. An exemplary database table "Tests" is shown in Table VIII below. The database table "Tests" illustrates an example of the data 232 in the database 230 of FIG. 2.

TABLE VIII

DATABASE TABLE "TESTS"

| 001 | Patient ID | Age | Gender | Race | Pyruvate Kinase RBC-cCnc |
|---|---|---|---|---|---|
| 002 | 1 | 17 | Male | Hispanic | 35 |
| 003 | 3 | 17 | Female | White | 29 |
| 004 | 4 | 18 | Male | Caucasian | 32 |
| 005 | 5 | 18 | Female | White | 36 |
| 006 | 6 | 18 | Female | Hispanic | 34 |
| 007 | 7 | 18 | Female | Caucasian | 31 |
| 008 | 8 | 19 | Female | Asian | 33 |
| 009 | 9 | 19 | Male | Caucasian | 28 |
| 010 | 10 | 19 | Male | Black | 35 |
| 011 | 11 | 19 | Female | Black | 27 |
| 012 | 12 | 19 | Female | White | 29 |
| 013 | 13 | 19 | Female | Caucasian | 29 |
| 014 | 14 | 19 | Male | Hispanic | 30 |
| 015 | 15 | 20 | Female | White | 32 |
| 016 | 16 | 20 | Female | Black | 31 |

As can be seen from Table VIII, the "Tests" table illustratively contains Patient ID, Age, Gender and Race information about each patient. The "Tests" table further includes a "Pyruvate Kinase RBC-cCnc" column having a Pyruvate Kinase RBC-cCnc value for each patient.

Executing Queries with Associated Accuracy Thresholds

Figure 8:
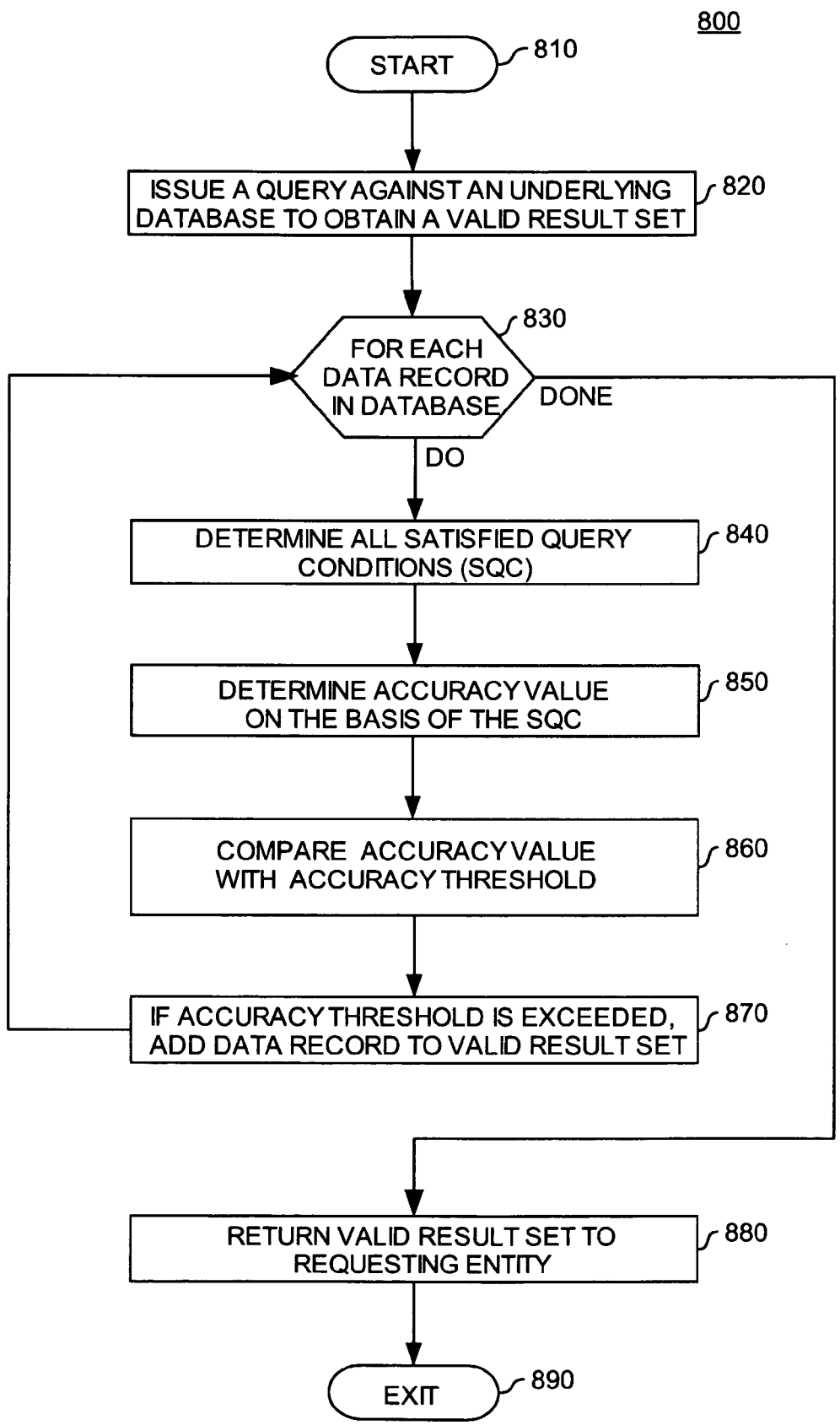
FIG. 8 is a flow chart illustrating a method of executing a query against an underlying database in one embodiment.

Referring now to FIG. 8, one embodiment of a method 800 for executing a query (e.g., abstract query 260 of FIG. 2) against an underlying database (e.g., database 230 of FIG. 2) to determine a valid result set (e.g., valid result set 234 of FIG. 2) is illustrated. At least part of the steps of the method 800 can be performed by a suitable query manager (e.g., query manager 280 of FIG. 2). Method 800 starts at step 810. For purposes of illustration, the steps of method 800 will be explained below with reference to the exemplary queries of Tables VI-VII and the exemplary database table of Table VII above.

At step 820, the exemplary abstract query of Table VI is issued from a requesting entity (e.g., application 240 of FIG. 2). The abstract query of Table VI is transformed into the concrete SQL query of Table VII, as explained above with reference to FIG. 2. The concrete SQL query of Table VII is executed against the exemplary database table of Table VII to obtain a valid result set. To this end, a loop consisting of steps 830-870 is entered for each data record contained in the "Tests" table of Table VII, which satisfies at least one of the query conditions of the SQL query of Table VII.

At step 830, the loop consisting of steps 830-870 is entered for a first data record which satisfies at least one query condition of the exemplary SQL query of Table VII. By way of example, assume that the loop is first entered for the data record of line 002 of Table VIII.

At step 840, all query conditions of the concrete SQL query of Table VII (lines 006-008) that are satisfied by the data record of line 002 of Table VII are determined. As the data record of line 002 of Table VIII includes as Gender "Male", Race "Hispanic" and a Pyruvate Kinase RBC-cCnc value of 35, all three query conditions of the concrete SQL query of Table VII are satisfied and, thus, determined.

At step 850, an accuracy value is determined for the data record of line 002 of Table VIII. To this end, an individual score is determined for the data record of line 002 of Table VII for each satisfied query condition. Accordingly, as described above with reference to Table VII, an indicative value is generated for the data record of line 002 of Table VII for each satisfied query condition. Each indicative value is then weighted by the weight that is associated with the corresponding satisfied query condition. More specifically, for the query condition in line 006 of Table VII, the indicative value "1" is generated as the gender of the data record is "Male". The indicative value "1" is multiplied with "0.25", which represents the weight of the query condition of line 006 of Table VII. Accordingly, a first individual score of "0.25" is obtained. For the query condition in line 007 of Table VII, the indicative value "1" is generated as the race is "Hispanic". The indicative value "1" is multiplied with "0.25", which represents the weight of the query condition of line 007 of Table VII. Accordingly, a second individual score of "0.25" is obtained. For the query condition in line 008 of Table VII, the indicative value "1" is generated as the Pyruvate Kinase RBC-cCnc is greater than "33". The indicative value "1" is multiplied with "0.50", which represents the weight of the query condition of line 008 of Table VII. Accordingly, a third individual score of "0.50" is obtained.

The three individual scores are combined to a total score which defines the accuracy value for the data record of line 002 of Table VII. Thus, the three individual scores are summed up to the total score of "1" (i.e., 0.25+0.25+0.50). Accordingly, the data record of line 002 of Table VII has an accuracy value of "1" which corresponds to an accuracy of 100% with respect to the query conditions in line 006-008 of the concrete SQL query of Table VII.

At step 860, the determined accuracy value is compared to a predefined accuracy threshold. In the given example, the determined accuracy value "1" of the data record of line 002 of Table VII is compared to the accuracy threshold "0.66" of the concrete SQL query of Table VII according to line 009 of Table VII (">=0.66"). If the accuracy value exceeds or equals the accuracy threshold, the data record is included with a valid result set for the concrete SQL query of Table VII at step 870. As in the given example the accuracy value of the data record of line 002 of Table VII exceeds the accuracy threshold (1>=0.66), the data record of line 002 of Table VII is a qualifying data record which is included with the valid result set.

Processing then returns to step 830, where a next data record which satisfies at least one of the query conditions of the concrete SQL query of Table VII is selected. Then, the loop consisting of steps 830-870 is entered for the next selected data record. Accordingly, the loop is entered subsequently for the data records in lines 004, 005, 006, 009, 010 and 014 of Table VII. However, only for the data records in lines 006 and 010 of Table VII an accuracy value can be determined which exceeds the accuracy threshold. Thus, only these data records are qualifying data records that are included with the valid result set, which consequently comprises the data records of lines 002, 006 and 010 of Table VII.

When the loop consisting of steps 830-870 has been performed for all selected data records, processing continues at step 880, where the valid result set is returned to the requesting entity. Method 800 then exits at step 890.

An exemplary result set table illustrating the valid result set is shown in Table IX below. The exemplary result set table illustrates an example of the valid result set 234 of FIG. 2.

TABLE IX

| RESULT SET TABLE | | | |
|---|---|---|---|
| 001 | Patient ID | Gender | Age |
| 002 | 1 | Male | 17 |
| 003 | 6 | Female | 18 |
| 004 | 10 | Male | 19 |

As can be seen from Table IX, the data record in line 002 contains data from the data record of line 002 of Table VII. Furthermore, the data record in line 003 contains data from the data record of line 006 of Table VII and the data record in line 004 contains data from the data record of line 010 of Table VIII. It should be noted that only the data record in line 002 of Table VII satisfies all query conditions of the concrete SQL query of Table VII, i.e., the exemplary abstract query of Table VI. The data records in lines 006 and 010 of Table VII do not satisfy all of these query conditions. However, these data records nevertheless form part of the valid result set as they sufficiently satisfy the query conditions and are, thus, also returned to the requesting entity. In the given example, the specified accuracy threshold allows to recognize that these data records also contain relevant information for the requesting entity.

While the foregoing is directed to embodiments of the present invention, other and further embodiments of the invention may be devised without departing from the basic scope thereof, and the scope thereof is determined by the claims that follow.

What is claimed is:

1. A computer-implemented method of composing a query against data in a database, comprising:
    receiving a query having one or more result fields and a plurality of query conditions, wherein each query condition defining selection criteria for selection of data records from the database, wherein each query condition specifies at least a field name for identifying a set of data values stored in the database that are associated with the field name, a comparison operator, and a value expression for comparison with each of the set of data values associated with the field name, and wherein each selected data record stores a data value that satisfies at least one of the plurality of query conditions, and wherein each of the plurality of query conditions has a first and second associated weight associated with a first and second accuracy threshold, respectively;
    receiving, for a first subset of query conditions of the plurality of query conditions, the first accuracy threshold;
    receiving, for a second subset of query conditions of the plurality of query conditions, the second accuracy threshold for qualifying data records, the first and second accuracy thresholds each defining a respective requested minimum accuracy of each selected data record defining a qualifying data record forming part of a valid result set returned for the query; and
    for each selected data record, determining whether the first and second accuracy thresholds are satisfied with respect to a cumulative weight of said weighted query conditions that are satisfied, wherein determining comprises:
        determining a first accuracy value on the basis of the first subset of query conditions, the first accuracy value being indicative of the accuracy of the data record with respect to the first subset of query conditions, and
        determining a second accuracy value on the basis of the second subset of query conditions, the second accuracy value being indicative of the accuracy of the data record with respect to the second subset of query conditions; and
    including, as the qualifying data records, with the valid result set for the query all selected data records having at least one of the first and second accuracy values that exceeds at least one of the corresponding first and accuracy thresholds.

2. The method of claim 1, wherein the query has at least one other query condition having no associated weight.

3. The method of claim 1, further comprising:
    receiving user input specifying at least one of: (i) a portion of the first and second associated weights for each one of the plurality of query conditions; and (ii) the first and second accuracy thresholds.

4. The method of claim 1, wherein the first and second accuracy thresholds are expressed as a percentage indicative of the minimum accuracy.

5. The method of claim 1, further comprising:
    for each query condition of the plurality of query conditions:
        associating the first and second weights with the query condition on the basis of predefined database settings; and
    wherein a different weight is associated with at least two of the query conditions, and wherein different weight is associated with the first and second weights associated with a given one of the query conditions.

6. The method of claim 1, wherein determining the first and second accuracy values of each data record comprises:
    for each satisfied query condition in the first and second subsets of query conditions, respectively, determining an individual score for the data record on the basis of the first and second weights associated with the query condition, respectively; and
    determining a total score for the data record on the basis of all determined individual scores for the satisfied query conditions in the first and second subsets, receptively, the total scores defining the first and second accuracy values.

7. The method of claim 6, wherein determining the individual score for the data record comprises:
    for a given satisfied query condition in one of the first and second subsets;
        generating a value indicative of the data record; and
        applying the weight associated with the given satisfied query condition to the indicative value to determine the individual score for the query condition.

8. The method of claim 1, wherein each query condition comprises a condition field and an associated value; and each result field and each condition field of the query is a logical field of a data abstraction model abstractly describing the data in the database; whereby the query defines an abstract query, and wherein the data abstraction model is adapted for transforming the one or more logical fields of the abstract query into a form consistent with a physical representation of the data in the database.

9. A non-transitory computer readable storage medium containing a program which, when executed by a processor, performs operations for executing a query against data in a database, the operations comprising:

receiving a query having one or more result fields and a plurality of query conditions, wherein each query condition defining selection criteria for selection of data records from the database, wherein each query condition specifies at least a field name for identifying a set of data values stored in the database that are associated with the field name, a comparison operator, and a value expression for comparison with each of the set of data values associated with the field name, and wherein each selected data record stores a data value that satisfies at least one of the plurality of query conditions, and wherein each of the plurality of query conditions has a first and second associated weight associated with a first and second accuracy threshold, respectively;

receiving, for a first subset of query conditions of the plurality of query conditions, the first accuracy threshold;

receiving, for a second subset of query conditions of the plurality of query conditions, the second accuracy threshold for qualifying data records, the first and second accuracy thresholds each defining a respective requested minimum accuracy of each selected data record defining a qualifying data record forming part of a valid result set returned for the query;

executing the query against the data in the database, comprising:
    identifying all selected data records from the database,
    applying, for a first subset of query conditions of the plurality of query conditions, the first accuracy threshold to each selected data record to determine whether the first accuracy threshold is satisfied for the selected data record with respect to a cumulative weight of said weighted query conditions that are satisfied thereby determining a first set of qualifying data records, and
    applying, for a second subset of query conditions of the plurality of query conditions, the second accuracy threshold to each selected data record to determine whether the second accuracy threshold is satisfied for the selected data record with respect to a cumulative weight of said weighted query conditions that are satisfied thereby determining a second set of qualifying data records; and
    outputting the first set of qualifying data and the second set of qualifying data as a valid result set.

10. The computer-readable medium of claim 9, wherein the first and second accuracy thresholds are expressed as a percentage indicative of the minimum accuracy.

11. The computer-readable medium of claim 9, wherein applying the first and second accuracy thresholds to each selected data record comprises:
    determining all query conditions of the respective first and second subsets of query conditions that are satisfied by the data record;
    determining an accuracy value for the data record on the basis of the respective first and second weights associated with the satisfied query conditions;
    comparing the determined accuracy value with the first and second accuracy thresholds to determine whether the first and second accuracy thresholds are exceeded; and
    including, as qualifying data records, with the valid result set for the query all selected data records having a determined accuracy value that exceeds at least one of the first and second accuracy thresholds.

12. The computer-readable medium of claim 11, wherein determining the accuracy value of each data record comprises:
    for each query condition that is satisfied by the data record:
        retrieving a weight indicating a relative importance of the query condition; and
        determining an individual score for the data record on the basis of the weight associated with the satisfied query condition; and
    determining a total score for the data record on the basis of all determined individual scores for the satisfied query conditions, the total score defining the accuracy value.

13. The computer-readable medium of claim 12, wherein a different weight is associated with at least two of the query conditions.

14. The computer-readable medium of claim 12, wherein determining the individual score for the data record comprises:
    for a given satisfied query condition;
        generating an indicative value for the data record; and
        applying the weight associated with the given satisfied query condition to the indicative value to determine the individual score for the given satisfied query condition.

15. The computer-readable medium of claim 9, wherein the operations further comprise:
    for each selected data record:
        determining a first accuracy value on the basis of the first subset of query conditions, the first accuracy value being indicative of the accuracy of the data record with respect to the first subset of query conditions; and
        determining a second accuracy value on the basis of the second subset of query conditions, the second accuracy value being indicative of the accuracy of the data record with respect to the second subset of query conditions; and
    including, as the qualifying data records, with the valid result set for the query all selected data records having at least one of the first and second accuracy values that exceeds the accuracy threshold.

16. The computer-readable medium of claim 9, wherein each query condition comprises a condition field and an associated value; and each result field and each condition field of the query is a logical field of a data abstraction model abstractly describing the data in the database; whereby the query defines an abstract query, and wherein the data abstraction model is adapted for transforming the one or more logical fields of the abstract query into a form consistent with a physical representation of the data in the database.

17. A system, comprising:
    a processor;
    a database accessible on a storage device, the database having data defining a plurality of data records;
    a user interface for issuing a query against the database, the query having one or more result fields and a plurality of query conditions, each query condition defining selection criteria for selection of data records from the database, wherein each query condition specifies at least a field name for identifying a set of data values stored in the database that are associated with the field name, a comparison operator, and a value expression for comparison with each of the set of data values associated with the field name, and wherein each selected data record stores a data value that satisfies at least one of the plurality of query conditions, and wherein each of the plurality of query conditions has an associated weight; and a memory storing a query manager for executing the query against the database, the query manager being configured to:

receive the query, identify all selected data records from the plurality of data records;

apply an accuracy threshold to each selected data record to determine whether the accuracy threshold is satisfied for the selected data record with respect to a cumulative weight of said weighted query conditions that are satisfied, wherein applying the accuracy threshold to each selected data record comprises:

applying, for a first subset of query conditions of the plurality of query conditions, a first accuracy threshold to the selected data record; and applying, for a second subset of query conditions of the plurality of query conditions, a second accuracy threshold to the selected data record;

for each selected data record:

determine a first accuracy value on the basis of the first subset of query conditions, the first accuracy value being indicative of the accuracy of the data record with respect to the first subset of query conditions; and determine a second accuracy value on the basis of the second subset of query conditions, the second accuracy value being indicative of the accuracy of the data record with respect to the second subset of query conditions, and include, as the qualifying data records, with the valid result set for the query all selected data records having at least one of the first and second accuracy values that exceeds the accuracy threshold.

* * * * *